United States Patent Office 3,640,910
Patented Feb. 8, 1972

3,640,910
ADVANCED ADDITION PRODUCTS CONTAINING TERMINAL EPOXIDE GROUPS
Daniel Porret, Binningen, Juergen Habermeier, Allschwil, and Hans Batzer, Arlesheim, Switzerland, assignors to Ciba Limited, Basel, Switzerland
No Drawing. Filed Apr. 2, 1969, Ser. No. 812,868
Claims priority, application Switzerland, Apr. 10, 1968, 5,379/68; Aug. 2, 1968, 11,638/68
Int. Cl. C08g 30/00
U.S. Cl. 260—2 EP
23 Claims

ABSTRACT OF THE DISCLOSURE

New, so-called "advanced" adducts containing epoxide groups, from polyepoxide compounds containing on an average more than one epoxide group in the molecule and mononuclear, five- or six-membered, unsubstituted or substituted N-heterocyclic compounds whose molecule contains two endocyclic NH groups, and less than one equivalent NH group for every epoxide group equivalent of the polyepoxide compound, obtained by reaction of for example 2 mols of diomethanediglycidyl ether and 1 mol of 5,5-dimethylhydantoin. The epoxide resins "advanced" with the aid of such nitrogen compounds have a good storage stability in addition to excellent electrical properties.

---

The (so-called) "advancement" of relatively low molecular and low melting or liquid epoxide resins by reaction with polyfunctional compounds of which the functional groups react with epoxide groups, to give relatively higher molecular, higher melting, epoxide resins is known. The purpose of such a (so-called) "advancement" is above all to improve or modify the technical processing properties for certain uses in the desired direction. For some uses, for example in sintering powders, compression moulding powders and the like, an increase in the softening point or melting point can be desirable. The (so-called) "advancement" in parallel with the increase in the molecule produces a reduction of the epoxide group content per kg. of resin and hence a reduction in the reactivity. This for example has a favourable effect when using the product as a casting and impregnating resin, in that the shrinkage occurring on reaction becomes less and the danger of the formation of cavities is reduced, above all in the case of larger castings.

The manufacture of epoxide resins of relatively higher average molecular weight and correspondingly lower epoxide content can, in the known condensation of epichlorhydrin with polyhydric phenols such as diomethane (2,2-bis(p-hydroxyphenyl)propane) in the presence of alkali admittedly also take place in a single stage in that a lesser stoichiometric excess of epichlorhydrin is used than in the manufacture of liquid polyglycidyl ethers. This process however suffers from the disadvantage that the sodium chloride produced during the condensation can only with difficulty be washed out of the solid epoxide resins thus obtained. Furthermore the products are as a rule very inhomogeneous in their composition and contain major proportions of branched or partially cross-linked products. The disadvantages described above can be largely avoided by manufacturing, in a first stage, low molecular liquid polyglycidyl ethers which are relatively homogeneous in composition and from which sodium chloride and excess alkali can be easily washed out, and subjecting the products thus obtained to a controlled (so-called) "advancement" reaction in a second stage. Such processes are for example described in U.S. patent specifications 2,615,008 and 3,006,892. Dihydric phenols such as diomethane, or dicarboxylic acids or their anhydrides are herein primarily used for the (so-called) "advancement."

When using dicarboxylic acids or dicarboxylic acid anhydrides the storage stability of the (so-called) "advanced" epoxide resins is frequently inadequate since these compounds represent active crosslinking agents or curing agents for epoxide resins and crosslinking reactions with free hydroxyl groups of the epoxide resin are possible even when using them in less than stoichiometric amounts.

In the use of diphenols for the (so-called) "advancement" which has hitherto been preferred in industry, no worsening of the storage stability such as arises when using dicarboxylic acid occurs. However it is a serious disadvantage that as a result of the incorporation of the aromatic ring structure of the diphenol into the molecule of the (so-called) "advanced" epoxide resin its electrical properties and in particular its tracking resistance and arcing resistance are negatively influenced. Such resins tend to form tracks containing carbon under electrical discharges and are therefore above all not as well suited to high voltage technology.

This disadvantage is particularly serious when (so-called) "advancing" relatively low molecular epoxide resins which themselves do not contain any aromatic rings, for example glycidyl esters of hydroaromatic dicarboxylic acids such as tetrahydrophthalic and hexahydrophthalic acid, cycloaliphatic polyepoxides of which the epoxide groups are present in cyclopentane or cyclohexane rings, or heterocyclic nitrogen-containing glycidyl compounds such as N,N'-diglycidyl-5,5-dimethyl-hydantoin.

These non-aromatic epoxide resins are as a rule distinguished by particularly good electrical properties. In contrast to the polyglycidyl ethers of polyphenols the chain length and the epoxide content of these non-aromatic epoxide resins cannot be varied within wide limits within the framework of a single-stage process. This aim can thus here only be achieved by a two-stage process or a (so-called) "advancement" reaction.

Now if a diphenol is used for the (so-called) "advancement," the originally excellent electrical properties of the indicated non-aromatic epoxide resins, above all the arcing resistance and tracking resistance, are decisively worsened as a result of the incorporation of aromatic rings into the resin molecule.

It has now surprisingly been found that in place of diphenols or dicarboxylic acids certain mononuclear N-heterocyclic compounds having 2 endocyclic NH groups, and above all hydantoins and their derivatives, barbituric acid and its derivatives or uracil or dihydrouracil and their derivatives can be employed for the (so-called) "advancement." The epoxide resins which have been (so-called) "advanced" with the aid of such nitrogen compounds show both a good storage stability and also outstanding electrical properties. When (so-called) "advancing" non-aromatic epoxide resins the good electrical properties are thus fully preserved. It furthermore also proves possible to improve the electrical properties of relatively low molecular polyglycidyl ethers of polyphenols by (so-called) "advancement" with the above-mentioned heterocyclic nitrogen compounds.

On reaction of lower molecular diepoxide compounds with the indicated N-heterocyclic compounds higher molecular diepoxides having an essentially linear molecular structure are produced. Thus for example the reaction of 2 mols of dimethanediglycidyl ether and 1 mol of 5,5-dimethylhydantoin yields a (so-called) "advanced" linear diepoxide according to the reaction equation:

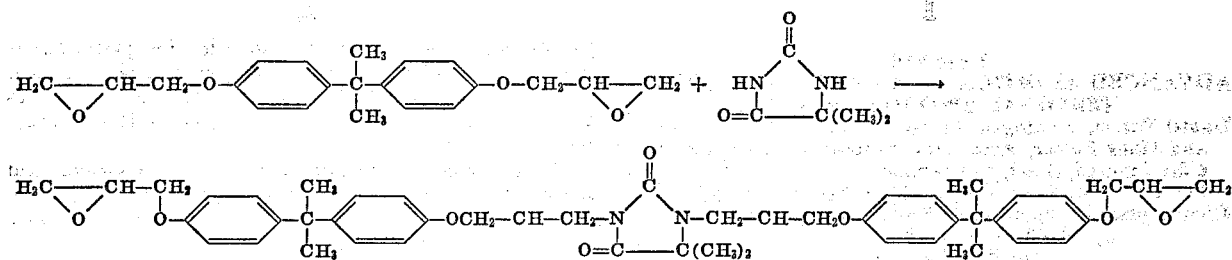

In practice more or less inhomogeneous mixtures of higher polymeric and lower polymeric (so-called) "advanced" epoxide resins are produced, with the composition of the mixture being displaced in favour of higher polymeric compounds when using relatively larger equivalent amounts of the N-heterocyclic compound. In general the manufacture of (so-called) "advanced" products in which the low polymeric constituents predominate is desirable since such products are more compatible and more easily processable. For this reason not more than 0.5 equivalent of NH group per 1 equivalent of epoxide group are usually employed. Best results are already achieved with significantly lesser stoichiometric amounts of the N-heterocyclic compound; mixtures of (so-called) "advanced" diepoxides with unchanged monomeric diepoxides are thereby produced.

It is admittedly already know from U.S.A. patent specifications 2,947,725 and 2,940,953 to react diepoxides such as diglycidyl ethers of dialcohols or diphenols or their mixtures with a monoepoxide, with cyanuric acid under such conditions that polyepoxide compounds of higher molecular weight are thereby produced. Because of the trifunctionality of the cyanuric acid no polyepoxides of linear structure but only branched molecules can thereby be produced. Since cyanuric acid also acts as a crosslinking agent or curing agent for epoxide resins, the manufacture of higher molecular epoxide resins which are still soluble and fusible is very delicate. Partially crosslinked or gelled products are very easily produced, which are industrially unusable.

The subject of the present invention are thus new (so-called) "advanced" adducts containing epoxide groups, from (1) a polyepoxide compound having an average of more than one epoxide group, preferably 2 to 3 epoxide groups, in the molecule and (2) less than 1 equivalent of NH group per 1 epoxide group equivalent of the polyepoxide compound (1) of a mononuclear N-heterocyclic compound of general formula

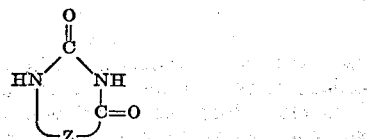

wherein Z denotes a nitrogen-free bivalent residue which is needed to complete a five-membered or six-membered unsubstituted or substituted heterocyclic ring.

The residue Z preferably consists only of carbon and hydrogen or of carbon, hydrogen and oxygen. It can for example be a residue of the formulae

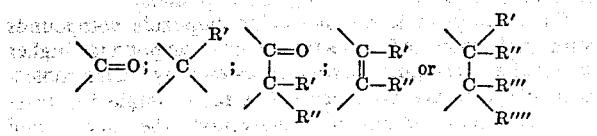

wherein R', R", R''' and R'''' independently of one another may each denote a hydrogen atom or for example an alkyl residue, an alkenyl residue, a cycloalkyl residue or an optionally substituted phenyl residue.

Preferably, 0.02 to at most 0.5 equivalent of NH groups of the N-heterocyclic compound (2) of Formula I are employed per 1 equivalent of epoxide groups of the polyepoxide compound (1) for the (so-called) "advancement."

Best results are achieved when using 0.06 to at most 0.3 equivalent of NH group per 1 epoxide equivalent.

The polyepoxide compounds which are particularly well suited to the manufacture of the new (so-called) "advanced" adducts containing epoxide groups are primarily those of the cycloaliphatic and N-heterocyclic series.

Furthermore, diepoxides are preferably used, and in particular those having an epoxide equivalent weight of not more than 500, preferably about 100 to 250. Such low molecular diepoxides are as a rule either liquid to highly viscous at room temperature or have a relatively low melting point. Through the adduct formation according to the invention such relatively low molecular diepoxides are converted into relatively higher molecular, higher melting diepoxides having an essentially linear chain structure.

As cycloaliphatic epoxide resins having at least one epoxide group present in an alicyclic five-membered or six-membered ring there may especially be mentioned:

vinyl-cyclohexene diepoxide,
limonene diepoxide,
dicyclopentadiene diepoxide,
bis(2,3-epoxycyclopentyl)ether,
bis-(3,4-epoxycyclohexylmethyl)adipate,
bis(3,4-epoxy-6-methylcyclohexylmethyl)adipate,
(3',4'-epoxycyclohexylmethyl)-3,4-epoxycyclohexanecarboxylate,
(3',4'-epoxy-6'-methylcyclohexylmethyl)-3,4-epoxy-6-methylcyclohexanecarboxylate,
3-(3',4'-epoxycyclohexyl)-2,4-dioxaspiro(5,5)-8,9-epoxyundecane,
3-(glycidyloxyethoxyethyl)-2,4-dioxaspiro(5,5)-8,9-epoxyundecane, and
3,9-bis(3',4'-epoxycyclohexyl)spirobi-(metadioxane).

As cycloaliphatic polyepoxide compounds which, whilst containing alicyclic ring systems, have the epoxide groups in alkyl side chains (above all as glycidyl groups) there may be mentioned: polyglycidyl esters of hydroaromatic polycarboxylic acids, for example $\Delta^4$-tetrahydrophthalic acid diglycidyl ester, 4-methyl-$\Delta^4$-tetrahydrophthalic acid diglycidyl ester, hexahydrophthalic acid diglycidyl ester and 4-methyl-hexahydrophthalic acid diglycidyl ester; also di- or poly-($\beta$-methylglycidyl)ethers and di- or poly-glycidyl ethers of alicyclic alcohols, such as for example the diglycidyl ethers or di-($\beta$-methylglycidyl)ethers of 2,2-bis-(4'-hydroxycyclohexyl)propane, 1,4-dihydroxycyclohexane (quinite) or $\Delta^3$-cyclohexane-1,1-dimethanol.

Possible polyepoxide compounds of the N-heterocyclic series are above all polyglycidyl compounds which contain a nitrogen-containing heterocyclic ring. One such compound is for example 1,3,5-tris-(β-glycidyloxypropionyl)-hexahydro-s-triazine of formula

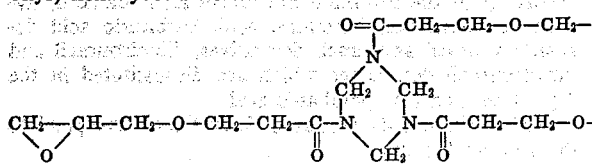

Preferably, polyglycidyl compounds of the N-heterocyclic series are employed in which the heterocyclic ring contains the grouping

at least once, and wherein the glycidyl groups are directly bonded to endocyclic nitrogen atoms. Such polyepoxides are conveniently accessible according to known methods by reaction of epichlorhydrin with heterocyclic urea derivatives such as particularly cyanuric acid, ethyleneurea, hydrantoin, substituted hydrantoins, bis(hydantoin) compounds, uracil, substituted uracils, dihydrouracils, or bis-(dihydrouracil) compounds in the presence of suitable catalysts, for example tertiary amines.

There may be mentioned: the triglycidylisocyanurate of formula

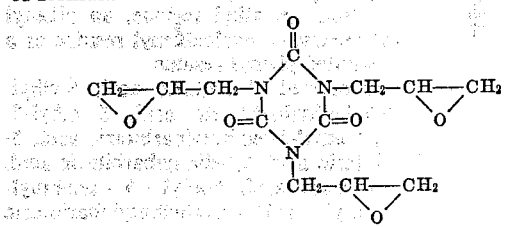

N,N'-diglycidyl-parabanic acid; N,N'-diglycidyl compounds of formula

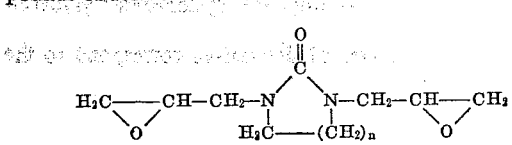

wherein $n=1$ or 2, that to say N,N'-diglycidylpropyleneurea and above all N,N'-diglycidylethyleneurea (=1,3-diglycidyl-imidazoline-2); N,N'-diglycidyl compounds of formula

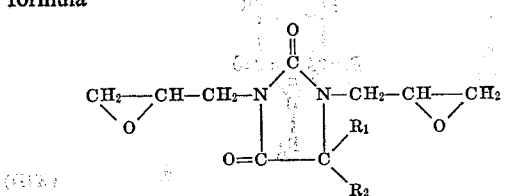

wherein $R_1$ and $R_2$ each denote a hydrogen atom or lower alkyl residue having 1 to 4 carbon atoms or wherein $R_1$ and $R_2$ together form a tetramethylene or pentamethylene residue; representatives of this class of compound are for example:

1,3-diglycidyl-hydrantoin,
1,3-diglycidyl-5-methyl-hydantoin,
1,3-diglycidyl-5-n-propyl-hydantoin,
1,3-diglycidyl-5-methyl-5-ethyl-hydantoin,

1,3-diglycidyl-1,3-diazaspiro(4,5)decane-2,4-dione,
1,3-diglycidyl-1,3-diazaspiro(4,4)-nonane-2,4 - dione and especially 1,3-diglycidyl-5,5-dimethyl-hydantoin as well as 1,3-diglycidyl-5-isopropyl-hydantoin.

N,N'-diglycidyl compounds of formula

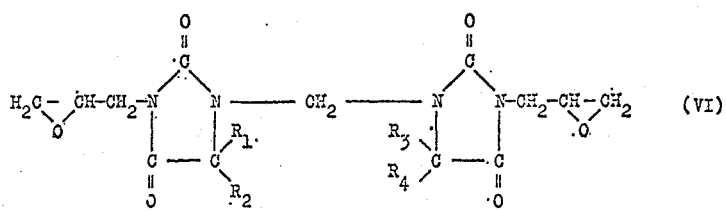

wherein $R_1$, $R_2$, $R_3$ and $R_4$ each denote a hydrogen atom or a lower alkyl residue having 1 to 4 carbon atoms, or wherein $R_1$ and $R_2$ and/or $R_3$ and $R_4$ together form a tetramethylene or pentamethylene residue; representatives of this class of compound are for example bis - (3 - glycidyl - 5,5 - dimethyl - hydantoinyl - 1) - methane, bis- (3 - glycidyl - 5 - methyl - 5 - ethylhydantoinyl - 1)-methane, and bis - (3 - glycidyl - 5 - propyl-hydantoinyl-1)-methane.

N,N'-diglycidyl compounds of formula

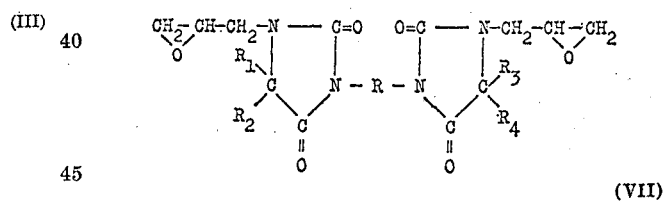

wherein R is an aliphatic, cycloaliphatic or araliphatic residue and $R_1$, $R_2$, $R_3$ and $R_4$ each denote a hydrogen atom or a lower alkyl residue having 1 to 4 carbon atoms, or wherein $R_1$ and $R_2$ and/or $R_3$ and $R_4$ together form a tetramethylene or pentamethylene residue; representatives of this class of compound are for example bis(1-glycidyl-5,5-dimethylhydantoinyl-3)methane,
1,2-bis(1'-glycidyl-5',5'-dimethylhydantoinyl-3')ethane,
1,4-bis(1'-glycidyl-5',5'-dimethylhydantoinyl-3')butane,
1,6-bis(1'-glycidyl-5',5'-dimethylhydantoinyl-3')hexane,
1,12-bis(1'-glycidyl-5'-5'-dimethylhydantoinyl-3') dodecane, and
β,β' - bis(1'-glycidyl-5',5'-dimethylhydantoinyl-3')diethyl ether.

N,N'-diglycidyl compounds of formula

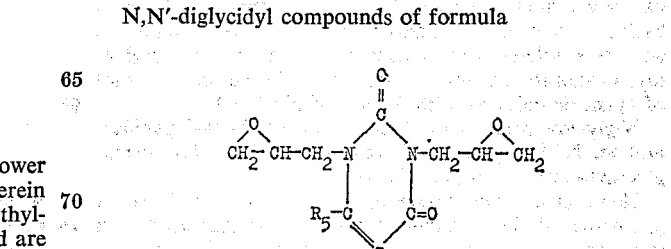

wherein $R_5$ and $R_6$ independently of one another each denote a hydrogen atom or alower alkyl residue having 1 to 4 carbon atoms; representatives of this class of compound are for example 1,3-diglycidyl-uracil, 1,3-diglycidyl-6-methyl-uracil and 1,3-diglycidyl-5-methyl-uracil.

N,N'-diglycidyl compounds of formula

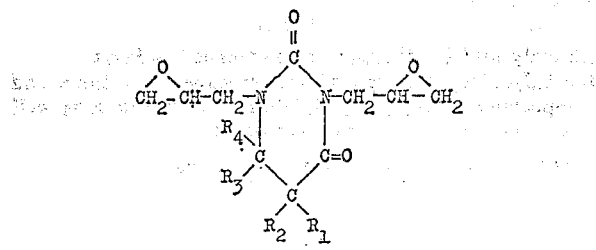

(IX)

wherein $R_1$ and $R_2$ denote identical or different alkyl residues, preferably methyl groups, and $R_3$ and $R_4$ independently of one another each denote a hydrogen atom or an alkyl residue ($R_3$ is preferably an alkyl residue having 1 to 4 carbon atoms and $R_4$ is preferably hydrogen).

Representatives of this class of compound are for example 1,3-diglycidyl-5,5-dimethyl - 5,6 - dihydro - uracil and 1,3-diglycidyl-5,5-dimethyl-6-isopropyl - 5,6 - dihydrouracil.

N,N'-diglycidyl compounds of formula

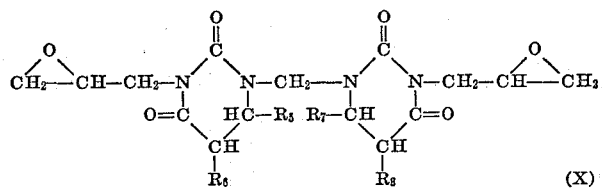

(X)

wherein $R_5$, $R_6$, $R_7$ and $R_8$ independently of one another each denote a hydrogen atom or a lower alkyl residue having 1 to 4 carbon atoms; representatives of this class of compound are for example 3,3'-diglycidyl-1,1'-methylene-bis(5,6-dihydrouracil), and 3,3'-diglycidyl-1,1'-methylene-bis(6-methyl-5,6-dihydro-uracil).

It is of course also possible to use mixtures of the abovementioned cycloaliphatic and/or heterocyclic epoxide resins, whereupon mixed adducts are formed.

It is however also possible to use other known classes of polyepoxide compounds or epoxide resins for the manufacture of the adducts according to the invention, for example diglycidyl or polyglycidyl ethers of polyhydric aliphatic alcohols, such as 1,4-butanediol or polyglycols such as polypropylene glycol; diglycidyl or polyglycidyl ethers of polyhydric phenols such as resorcinol, bis(p - hydroxyphenyl)methane, 2,2 - bis(p - hydroxyphenyl)propane (=diomethane or bisphenol A), 2,2-bis(4'-hydroxy-3',5'-dibromophenyl)propane, 1,1,2,2-tetrakis(p-hydroxyphenyl)ethane or condensation products of phenols with formaldehyde obtained under acid conditions such as phenol novolacs and cresol novolacs.

Polyglycidyl esters of polybasic aliphatic or aromatic carboxylic acids such as adipic acid, phthalic acid, tetrahydrophthalic and hexahydrophthalic acid, isophthalic acid, terephthalic acid or trimellitic acid, and also triglycidyl cyanurate (manufactured by condensation of 1 mol of cyanuric chloride with 3 mols of glycidol).

N-glycidyl derivatives of amines such as N,N-diglycidyl-aniline, N,N - diglycidyl - toluidine, and N,N,N',N'-tetraglycidyl-bis(p-aminophenyl)methane.

However as a rule above all the advantageous electrical properties of the moulding materials manufactured with such adducts based on aromatic polyepoxides are less pronounced than when using adducts based on the cycloaliphatic or N-heterocyclic polyepoxide compounds which were mentioned earlier.

The mononuclear N-heterocyclic compounds of Formula I used for the manufacture of the new adducts according to the invention are above all hydantoin, hydantoin derivatives, barbituric acid, barbituric acid derivatives, uracil and uracil derivatives, dihydrouracil and dihydrouracil derivatives which are disubstituted in the 5-position, and also parabanic acid.

Hydantoin and its preferred derivatives correspond to the general formula

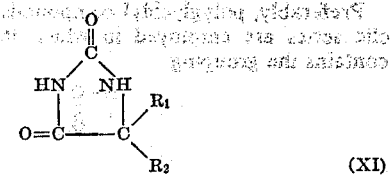

(XI)

wherein $R_1$ and $R_2$ each denote a hydrogen atom or a lower alkyl residue having 1 to 4 carbon atoms, or wherein $R$ and $R_2$ together form a tetramethylene or pentamethylene residue. Hydantoin, 5-methyl-hydantoin, 5-methyl-5-ethylhydantoin, 5-n-propylhydantoin, 5-isopropyl-hydantoin, 1,3 - diaza - spiro(4,5) - decane-2,4-dione, 1,3-diaza-spiro(4,4)-nonane-2,4-dione and preferably 5,5-dimethyl-hydantoin may be mentioned.

Barbituric acid and its preferred derivatives correspond to the general formula

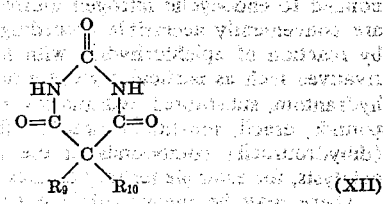

(XII)

wherein $R_9$ and $R_{10}$ independently of one another each denote a hydrogen atom, an alkyl residue, an alkenyl residue, a cycloalkyl residue or cycloalkenyl residue or a substituted or unsubstituted phenyl residue.

There may be mentioned: barbituric acid, 5-ethyl-barbituric acid, 5,5-diethylbarbituric acid, 5 - ethyl-5-butylbarbituric acid, 5-ethyl-5-sec-butylbarbituric acid, 5-ethyl-5-isopentylbarbituric acid, 5,5-diallylbarbituric acid, 5-allyl-5-isopropylbarbituric acid, 5-allyl - 5 - sec-butyl-barbituric acid, 5 - ethyl - 5(1' - methylbutyl)barbituric acid, 5-allyl-5(1'-methylbutyl)barbituric acid, 5-ethyl-5-(1'-methyl-1'-butenyl)barbituric acid, 5 - ethyl-5-phenyl-barbituric acid and 5 - ethyl-5(1'-cyclohexen-1-yl)barbituric acid.

Uracil and its preferred derivatives correspond to the general formula

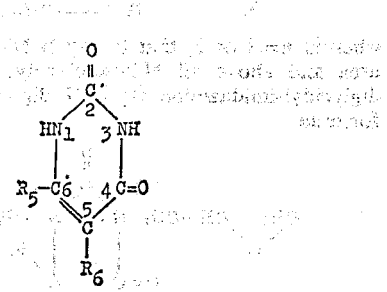

(XIII)

wherein $R_5$ and $R_6$ each denote a hydrogen atom or one of the two residues denote the hydrogen atom and the other residue denotes a methyl group.

Uracils of Formula XIII are uracil itself and also 6-methyl-uracil and thymin (=5-methyl-uracil).

Dihydro-uracil (=2,4-dioxohexahydropyrimidine) and its preferred derivatives, especially the dihydrouracil derivatives which are disubstituted in the 5-position, correspond to the general formula

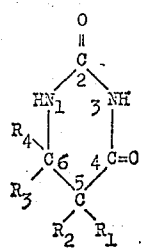

(XIV)

wherein $R_1$ and $R_2$ independently of one another each denote a hydrogen atom or identical or different alkyl residues, preferably methyl groups, and $R_3$ and $R_4$ independently of one another each denote a hydrogen atom or an alkyl residue ($R_3$ is preferably an alkyl residue having 1 to 4 carbon atoms and $R_4$ is preferably hydrogen).

Substituted dihydro-uracils of Formula XIV are 5,5-dimethyl-5,6-dihydro-uracil (=2,4-dioxo-5,5-dimethylhexahydropyrimidine) and 5,5-dimethyl-6-isopropyl-5,6-dihydro-uracil (=2,4-dioxo-5,5-dimethyl-6-isopropyl-hexahydropyrimidine).

The new adducts according to the invention are as a rule manufactured by heating the polyepoxide compound (1) together with the mononuclear N-heterocyclic compound of Formula I and in particular as a rule in the temperature range of 100–200° C. and preferably at 120–170° C. As mentioned above, the reagents are preferably allowed to react with one another in such quantitative ratios that not more than 0.5 equivalent of NH group of the N-heterocyclic compound of Formula I is used per 1 epoxide equivalent of epoxide group, that is to say at least 1 mol of a diepoxide compound is used per 1 equivalent of NH group. The reaction can be accelerated by adding suitable catalysts. Such catalysts are for example alkali hydroxides such as sodium hydroxide or alkali halides such as lithium chloride, potassium chloride or sodium chloride, bromide or fluoride; tertiary amines such as triethylamine, tri-n-propylamine, benzyldimethylamine, N,N'-dimethylaniline and triethanolamine; quaternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate or methyltriethylammonium chloride; hydrazines having a tertiary nitrogen atom, such as 1,1-dimethylhydrazine, which can also be employed in the quaternised form.

Depending on the choice of the starting substances the reaction however in some cases takes place quantitatively so rapidly that no addition of catalyst is necessary. Whilst the starting substances are as a rule mixed with one another at room temperature and are then brought to the reaction temperature, it is advantageous in the case of very reactive components if the polyepoxide compound is first introduced and heated by itself to the requisite reaction temperature and the other reaction components then gradually added in small portions. The progress of the reaction up to the end product having a defined epoxide group content which essentially remains constant can be followed by titration of the epoxide group using samples taken during the reaction.

The new (so-called) "advanced" addition products obtained according to the process of the invention are mostly solid at room temperature; their softening points as a rule lie between 40 and 140° C.; the colour of these resin-like adducts varies from colourless glass-clear through yellow to brown. Because of their content of free epoxide groups these (so-called) "advanced" adducts react with the usual curing agents for epoxide compounds and can therefore be cross-linked or cured by adding such curing agents, analogously to other polyfunctional epoxide compounds or epoxide resins. Possible curing agents of this kind are basic or acid compounds.

As suitable curing agents there may for example be mentioned: amines or amides such as aliphatic, cycloaliphatic or aromatic primary, secondary and tertiary amines, for example monoethanolamine, ethylenediamine, hexamethylenediamine, trimethylhexamethylenediamine, diethylenetriamine, triethylenetetramine, tetraethylenepentamine, N,N - dimethylpropylenediamine - 1,3, N,N-diethylpropylenediamine - 1,3, bis(4' - amino - 3 - methyl - cyclohexyl)methane, 2,2 - bis(4' - aminocyclohexyl) propane, 3,5,5 - trimethyl - 3 - (aminomethyl)-cyclohexylamine ("isophoronediamine"), N - aminoethyl-piperazine, Mannich bases, such as 2,4,6 - tris(dimethylaminomethyl)phenol; m - phenylenediamine, p - phenylenediamine, bis(p - aminophenyl)methane, bis(p - aminophenyl)sulphone and m - xylylenediamine; adducts of acrylonitrile or monoepoxides such as ethylene oxide or propylene oxide, to polyalkylenepolyamines such as diethylenetriamine or triethylenetetramine; adducts of polyamines such as excess diethylenetriamine or triethylenetetramine, and polyepoxides such as bisphenol - A - polyglycidyl ethers; ketimines, for example from acetone or methyl ethyl ketone and bis(p-aminophenyl)methane; adducts of monophenols or polyphenols and polyamines; polyamides, especially those from aliphatic polyamines, such as diethylenetriamine or triethylenetetramine and dimerised or trimerised unsaturated fatty acids such as dimerised linseed oil fatty acid ("Versamid"); polymeric polysulphides ("Thiokol"); dicyandiamide; anilineformaldehyde resins; polyhydric phenols, for example resorcinol, 2,2 - bis(4 - hydroxyphenyl)propane or phenolformaldehyde resins; boron trifluoride and its complexes with organic compounds, such as $BF_3$-ether complexes and $BF_3$-amine complexes, for example $BF_3$-monoethylamine complex; acetoneacetanilide-$BF_3$ complex; phosphoric acid, triphenylphosphite; polybasic carboxylic acids and their anhydrides, for example phthalic anhydride, tetrahydrophthalic anhydride, hexahydrophtalic anhydride, 4 - methylhexahydrophthalic anydride, 3,6 - endomethylene - $\Delta^4$ - tetrahydrophthalic anhydride, 4 - methyl-3,6-endomethylene-$\Delta^4$-tetrahydrophthalic anhydride (=methylnadicanhydride), 3,4,5,6,7,7 - hexachlor - 3,6 - endomethylene - $\Delta^4$ - tetrahydrophthalic anhydride, succinic anhydride, adipic anhydride, azelaic anhydride, sebacic anhydride, maleic anhydride, dodecenylsuccinic anhydride; pyromellitic dianhydride or mixtures of such anhydrides.

It is particularly advantageous to use curing agents which in themselves yield moulding materials of good electrical properties, such as especially cycloaliphatic dicarboxylic acid anhydrides such as for example $\Delta^4$-tetrahydrophthalic anhydride or hexahydrophthalic anhydride, or cycloaliphatic polyamines such as for example bis(4' - amino - 3 - methyl - cyclohexyl)methane or "isophoronediamine."

It is furthermore possible to use cure accelerators during the cure, and in particular when using polyamides, polymeric polysulphides, dicyandiamide or polycarboxylic acid anhydrides as curing agents; such accelerators are for example tertiary amines, their salts or quaternary ammonium compounds, for example 2,4,6-tris(dimethylaminomethyl)phenol, benzyldimethylamine, 2 - ethyl-4-methyl - imidazole or triamylammonium phenolate; or alkali metal alcoholates such as for example sodium hexanetriolate.

The expression "cure" as used here denotes the conversion of the above adducts containing epoxide groups into insoluble and infusible crosslinked products, and in particular as a rule with simultaneous shaping to give shaped articles such as castings, pressings or laminates, or to give two-dimensional structures such as coating, lacquer films or adhesive bonds.

If desired, it is possible to add to the (so-called) "advanced" adducts containing epoxide groups according to the invention, active diluents such as for example styrene oxide, butylglycidyl ether, isooctylglycidyl ether, phenylglycidyl ether, cresylglycidyl ether or glycidyl esters of synthetic highly branched mainly tertiary aliphatic monocarboxylic acids ("Cardura E"), or cycloaliphatic monoepoxides such as 3-vinyl - 2,4 - dioxaspiro(5,5)-9,10-epoxy-undecane.

The adducts according to the invention can furthermore be used mixed with other curable diepoxide or polyepoxide compounds. As such there may for example be mentioned: polyglycidyl ethers of polyhydric alcohols such as 1,4 - butanediol, polyethylene glycols, polypropylene glycols or 2,2 - bis - (4' - hydroxycyclohexyl)-propane; polyglycidyl ethers of polyhydric phenols such as 2,2 - bis(4' - hydroxyphenyl)-propane (=diomethane or bisphenol A), 2,2 - bis(4' - hydroxy - 3',5' - dibromo-phenyl)propane, bis (4 - hydroxyphenyl)sulphone, 1,1, 2,2 - tetrakis(4 - hydroxyphenyl)ethane or condensation products of formaldehyde with phenols produced in an acid medium, such as phenol novolacs or cresol novolacs; polyglycidyl esters of polycarboxylic acids such as for example phthalic acid diglycidyl ester, tetrahydrophthalic acid diglycidyl ester or hexahydrophthalic acid diglycidyl ester; triglycidyl isocyanurate, N,N' - diglycidyl - 5,5 - dimethylhydantoin, or amino polyepoxides such as are obtained by dehydrohalogenation of the reaction products of epihalogenohydrin and primary or secondary amines such as aniline or 4,4' - diaminodiphenylmethane; also alicyclic compounds containing several epoxide groups such as vinylcyclohexenediepoxide, dicyclopentadienediepoxide, ethylene glycol - bis(3,4 - epoxytetrahydrodicyclopentadien - 8 - yl) - ether, bis(3,4 - epoxycyclohexylmethyl)adipate, (3',4' - epoxycyclohexylmethyl)-3,4 - epoxycyclohexanecarboxylate, (3',4' - epoxy - 6'-methyl-cyclohexylmethyl) - 3,4 - epoxy - 6 - methyl-cyclohexanecarboxylate, bis(cyclopentyl)ether diepoxide or 3 - (3',4' - epoxycyclohexyl) - 2,4 - dioxaspiro - (5,5)9, 10-epoxy-undecane.

The subject of the present invention therefore also includes curable mixtures which are suitable for the manufacture of shaped articles including two-dimensional structures and which contain the (so-called) "advanced" adducts containing epoxide groups according to the invention, optionally together with other diepoxide or polyepoxide compounds and also curing agents for epoxide resins such as polyamines or polycarboxylic acid anhydrides.

The adducts according to the invention, or their mixtures with other polyepoxide compounds and/or curing agents, can furthermore be mixed, at any stage before cure, with usual modifiers such as extenders, fillers and reinforcing agents, pigments, dyestuffs, organic solvents, plasticisers, flow control agents, agents for conferring thixotropy, flameproofing substances or mould release agents.

As extenders, reinforcing agents, fillers and pigments which can be employed in the curable mixtures according to the invention there may for example be mentioned: coal tar, bitumen, glass fibres, boron fibres, carbon fibres, cellulose, polyethylene powder, polypropylene powder, mica, asbestos, quartz powder, slate powder, aluminium oxide trihydrate, chalk powder, gypsum, antimony trioxide, bentones, silica aerogel ("Aerosil"), lithopone, baryte, titanium dioxide, carbon black, graphite, iron oxide or metal powder such as aluminium powder or iron powder.

The following are for example suitable as organic solvents for modifying the curable mixtures: toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixyleneyl phosphate and also polypropylene glycols may for example be employed as plasticisers for modifying the curable mixtures.

Especially for use in the lacquer field, the new adducts containing epoxide groups can furthermore be partially or completely esterfied in a known manner with carboxylic acids, such as especially higher unsaturated fatty acids. It is furthermore possible to add other curable synthetic resins, for example phenoplasts or aminoplasts to such lacquer resin formulations.

It is furthermore also possible to add other usual additives, for example flameproofing agents, agents for conferring thixotropy, flow control agents such as silicones, cellulose acetobutyrate, polyvinyl butyral, waxes, stearates and the like (which are in part also used as mould release agents) to the curable mixtures.

The curable mixtures can be manufactured in the usual manner with the aid of known mixing equipment (stirrers, kneaders, rollers and the like).

The curable epoxide resin mixtures are above all employed in the fields of surface protection, the electrical industry, laminating processes and the building industry. They can be used in a formulation which is in each case suited to the particular end use, in the unfilled or filled state, optionally in the form of solutions or emulsions, as paints, lacquers, sintering powders, compression moulding compositions, dipping resins, casting resins, injection moulding formulations, impregnating resins and adhesives, as tool resins, laminating resins, sealing and filling compositions, floor covering compositions and binders for mineral aggregates.

A main field of application lies in the field of compression moulding powders and of sintering powders. Here the epoxide resin powder mixtures can be processed without pressure or with pressure, according to known processes such as fluidised bed sintering, electrostatic fluidised bed sintering, spraying, electrostatic spraying, compression moulding and the like.

In the examples which follow, unless otherwise stated, parts denote parts by weight and percentages denote percentages by weight. The relationship of the parts by volume to the parts by weight is as that of the millilitre to the gram.

The following epoxide resins were used for the manufacture of (so-called) "advanced" adducts containing epoxide groups, described in the examples:

EPOXIDE RESIN A

Polyglycidyl ether resin (commercial product) manufactured by condensation of diomethane (2,2-bis(p-hydroxyphenyl)-propane) with a stoichiometric excess of epichlorhydrin in the presence of alkali, consisting mainly of diomethane diglycidyl ether of formula

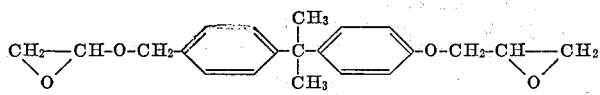

which is liquid at room temperature and has the following characteristics:

Epoxide content: 5.1–5.5 epoxide equivalents/kg.
Viscosity at 25° C.: 9000–13,000 cp.

EPOXIDE RESIN B

Cycloaliphatic polyglycidyl ester (commercial product) mainly consisting of hexahydrophthalic acid diglycidyl ester of formula

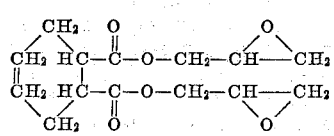

which is liquid at room temperature and has the following characteristics:

Epoxide content: 6.5±0.3 epoxide equivalents/kg.
Viscosity at 25° C.: 320–380 cp.

EPOXIDE RESIN C

Cycloaliphatic polyglycidyl ester (commercial product) mainly consisting of Δ⁴-tetrahydrophthalic acid diglycidyl ester of formula

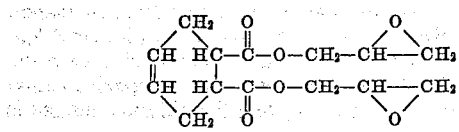

which is liquid at room temperature and has the following characteristics:

Epoxide content: 6.3±0.3 epoxide equivalents/kg.
Viscosity at 25° C.: 450–550 cp.

EPOXIDE RESIN D

Cycloaliphatic epoxide resin (commercial product) consisting mainly of the diepoxide of formula

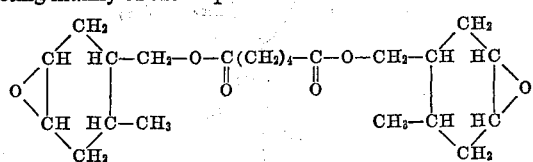

(=bis(6-methyl - 3,4 - epoxy-cyclohexyl-methyl)adipate), which is liquid at room temperature and has the following characteristics:

Epoxide content: 4.5–4.9 epoxide equivalents/kg.
Viscosity at 25° C.: about 900 cp.

EPOXIDE RESIN E

Cycloaliphatic epoxide resin (commercial product) mainly consisting of the diepoxide of formula

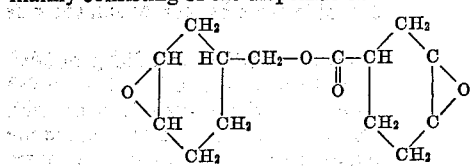

(=3',4'-epoxy-cyclohexyl-methyl) - 3,4 - epoxy-cyclohexanecarboxylate), which is liquid at room temperature and has the following characteristics:

Epoxide content: 7.0–7.8 epoxide equivalents/kg.
Viscosity at 25° C.: about 350 cp.

EPOXIDE RESIN F

Cycloaliphatic epoxide resin (commercial product) mainly consisting of the diepoxide of formula

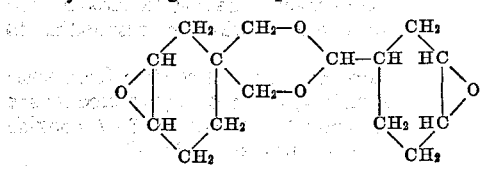

(=3-(3',4'-epoxycyclohexyl)-2,4-dioxaspiro (5,5) - 8,9-epoxyundecane), which is a viscous liquid at room temperature and has the following characteristics:

Epoxide content: 6.0–6.2 epoxide equivalents/kg.
Viscosity at 25° C.: 125,000–200,000 cp.

EPOXIDE RESIN G

Cycloaliphatic epoxide resin (commercial product) consisting mainly of the diepoxide of formula

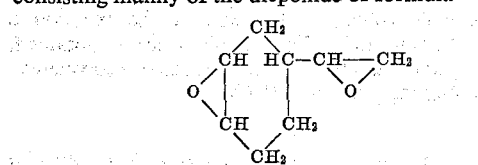

(=vinylcyclohexene-diepoxide) which is liquid and of low viscosity at room temperature and has the following characteristics:

Epoxide content: 13.8–14.0 epoxide equivalents/kg.
Viscosity at 25° C.: 25 cp.

EPOXIDE RESIN H

An N-hereocyclic epoxide resin consisting of crystalline 1,3-diglycidyl-5,5-dimethyl-hydantoin of formula

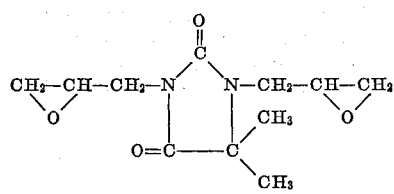

having an epoxide content of 8.0–8.25 epoxide equivalents/kg.

It can be manufactured as follows: a mixture of 128 g. of 5,5-dimethyl-hydantoin, 2775 g. of epichlorhydrin and 1 g. of triethylamine was heated to boiling at 117° C. The epichlorhydrin adds to both NH groups to form firstly N-chlorohydrin and then N-glycidyl groups. The formation of N-glycidyl groups during the reaction was followed by titration of samples after distillation off the unreacted epichlorhydrin. After 3 hours the resin contained 4.76 epoxide equivalents/kg. The mixture was cooled to 60° C. and thereafter 240 g. of 97% strength sodium hydroxide were added in portions over the course of 35 minutes. The temperature was kept at 60° C. by slight cooling. After adding the sodium hydroxide the mixture was stirred at 60° C. for a further 30 minutes. The reaction product was then concentrated under a vacuum of 35 mm. Hg until the entire quantity of water formed had been azeotropically distilled off. Thereafter the resulting salt was filtered off and washed with a little epichlorhydrin. The product was then further concentrated, first under a vacuum of 20 mm. Hg in order to recover the excess epichlorhydrin, and then under a vacuum of 0.2 mm. Hg in order to remove the last traces of volatile constituents.

237 g. of a clear yellow resin of low viscosity were obtained; this corresponds to 99% of theory. The resin contained 7.7 epoxide equivalents/kg. and 2.5% of chlorine. The product was completely soluble in water. It mainly consists of 1,3-diglycidyl-5,5-dimethyl-hydantoin.

The 1,3 - diglycidyl-5,5-dimethyl-hydantoin described above, which contained 7.7 epoxide equivalents/kg. crystallises after having been seeded to give an almost solid sludge.

80 g. of crystalline sludge were thoroughly suctioned through a glass filter. Hereupon 19 g. of a dark liquid and 60 g. of a crystalline almost colourless substance were obtained.

The abovementioned crystalline substance can also be purified by trituration with an alcohol such as ethanol or isopropanol. A compound with 8.25 epoxide equivalents/kg. was obtained in this manner.

EPOXIDE RESIN I

N-heterocyclic epoxide resin consisting mainly of 1,3-diglycidyl-imidazolidone-2 of formula

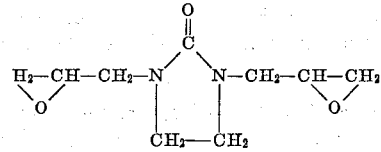

It can be manufactured as follows: a mixture of 344 g. of crude ethyleneurea (88% strength), 3700 g. of epichlorhydrin and 3.2 g. of triethylamine was brought to the boil at 110° C. Thereafter the mixture was cooled to 60° C. and 340 g. of sodium hydroxide (97% strength) were added in portions over the course of 30 minutes.

The temperature was kept at 60° C. by occasional cooling. The mixture was stirred for a further 30 minutes at 60° C. The reaction product was then concentrated under 30 mm. pressure until the resulting water had been azeotropically distilled off. The salt was filtered off and washed with a little epichlorhydrin. The product was then further concentrated, first under 20 mm. pressure in order to recover the epichlorhydrin, and then under 0.2 mm. in order to remove the last traces of volatile constituents.

662 g. of 1,3-diglycidylimidazolidone-2 were obtained as a yellow resin of low viscosity which contained 8.5 gram equivalents of epoxide groups/kg. and 2.0% of chlorine. The product was soluble in water to give a completely clear solution.

EPOXIDE RESIN K

An N-heterocyclic epoxide resin (commercial product) consisting of crystalline triglycidyl isocyanurate of formula

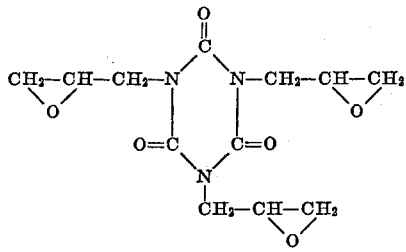

having an epoxide content of 9.1–9.8 epoxide equivalents/kg.

EPOXIDE RESIN L

An N-heterocyclic epoxide resin consisting of a crystalline diepoxide of formula

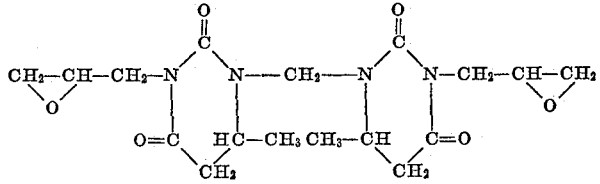

[3,3' - diglycidyl - 1,1' - methylene - bis-(6-methyl-5,6-dihydrouracil)], having an epoxide content of 5.1–5.2 epoxide equivalents/kg.

It can be manufactured as follows:

(a) Manufacture of 1,1'-methylene-bis-(6-methyl-5,6-dihydro-uracil)

A homogeneous mixture of 20.0 g. of 6-methyl-5,6-dihydro-uracil (2,4 - dihydroxy - 6-methyl-5,6-dihydropyrimidine) [0.156 mol], 2.5 of paraformaldehyde (0.078 mol) and 11.7 ml. of concentrated hydrochloric acid is thoroughly stirred at room temperature. The mixture spontaneously warms to about 45° C. over the course of 30 minutes, and is then warmed to 70° C. for a further 30 minutes whilst stirring. The mixture is allowed to stand overnight, 150 ml. of water are stirred into it, and the batch is filtered. The pure white finely crystalline substance is washed with cold water until the wash water reacts neutral. After drying at 120° C. 16.0 g. of 1,1'-methylene-bis(6-methyl-5,6-dihydro - uracil) (72.1% of theory) of melting point 288–290° C. are obtained.

(b) Glycidylation

A mixture of 6.67 g. of 1,1'-methylene-bis(6-methyl-5,6-dihydro-uracil) [0.025 mol], 92.5 g. of epichlorhydrin (1 mol, corresponding to 20 mols per mol of NH) and 0.041 g. of tetraethylammonium chloride (1 mol percent) is heated to 115–117° C. for 6 hours whilst stirring. After cooling to 60° C. 2.2 g. of finely powdered solid sodium hydroxide (0.055 mol) are added in small portions over the course of 30 minutes whilst stirring thoroughly. After working-up, 8.7 g. of a colourless resin of low viscosity are obtained (92.3% of theory), and this on cooling solidifies to give colourless small crystals; the epoxide content is 5.15 epoxide equivalents/kg. (corresponding to 98% of theory) and the melting point is 121–122° C. A sample was recrystallised from methanol. The 3,3' - diglycidyl - 1,1' - methylene-bis-(6-methyl-5,6-dihydro-uracil) which had been recrystallised once melts at 128–129° C., its epoxide content is 5.19 epoxide equivalents/kg. (98.8% of theory) and the chlorine content is 0.5%.

EPOXIDE RESIN M

An N-heterocyclic epoxide resin consisting of crystalline tri-(β-methylglycidyl)-isocyanurate of formula

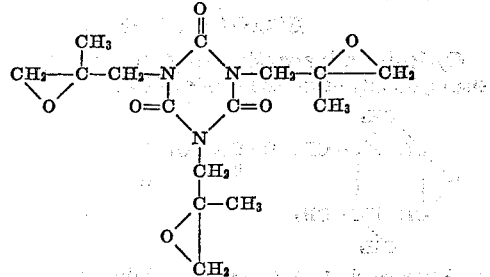

having an epoxide content of 8.49 epoxide equivalents/kg.

It can be manufactured as follows:

A mixture of 90.4 of cyanuric acid (0.7 mol), 0.7 g. of tetramethylammonium chloride and 2236 g. of β-methylepichlorhydrin (21 mols) is stirred for 5½ hours at reflux temperature. In the course of this the boiling point of the mixture rises from 120° C. to 125° C. After 3 hours a further 0.5 g. of tetramethylammonium chloride was added.

The mixture is now cooled to 60° C. and 202 g. of 50% strength aqueous sodium hydroxide solution (2.52 mols) are slowly added dropwise over the course of 2 hours with vigorous stirring; at the same time the water present in the reaction mixture is removed continuously over the course of 50 minutes by azeotropic circulatory distillation at 60° C. The mixture is cooled to room temperature and the sodium chloride formed in the reaction is removed by filtration. The clear yellow filtrate is concentrated at 60° C./20 mm. Hg and is then kept at 60° C. under 0.1 mm. Hg to remove the last volatile constitutents, until it has reached constant weight. The product which crystallises gradually is poured onto a metal sheet.

189.4 g. of crude tri-(β-methylglycidyl)-isocyanurate (79.8% of theory) are obtained, having an epoxide content of 7.75 epoxide equivalents/kg. (corresponding to 87.7% of theory).

After recrystallisation of the crude product from ethanol according to Example 1, 130 g. of a pure product are obtained, having an epoxide content of 8.49 epoxide equivalents per kg. and melting at 86–88° C.

EXAMPLES OF MANUFACTURE

Example 1

256 parts of 5,5-dimethyl-hydantoin, 1504 parts of epoxide resin A (liquid diomethane diglycidyl ether with an epoxide content of 5.28 epoxide equivalents/kg.) and 0.8 part by volume of aqueous sodium hydroxide solution are mixed. The mixture is heated to 160° C. whilst stirring and is then stirred for 5 hours at this temperature. After 2 hours the epoxide content has dropped to 2.48 epoxide equivalents/kg.; at the end of the reaction a (so-called) "advanced" solid epoxide resin is obtained, having an epoxide content of 2.32 epoxide equivalents/kg. and a softening point of 48° C.

Example 2

A mixture of 319 parts of epoxide resin B (diglycidyl hexahydrophthalate) having an epoxide content of 6.27 epoxide equivalents/kg., 64 parts of 5,5-dimethylhydantoin (corresponding to a ratio of epoxide groups: NH groups=2:1) and 0.1 part by volume of 30% strength aqueous sodium hydroxide solution is heated to 150–160° C. whilst stirring. After 25 minutes the epoxide content of the reaction mixture is 3.88 epoxide equivalents/kg. and after 50 minutes it is 3.12 epoxide equivalents per kg. After one hour the reaction is ended by pouring the melt out onto a metal sheet. A tough-tacky (so-called) "advanced" epoxide resin is obtained, having an epoxide content of 2.84 epoxide equivalents/kg.

Example 3

A mixture of 431 parts of epoxide resin D (liquid cycloaliphatic epoxide resin with an epoxide content of 4.6 epoxide equivalents/kg.), 64 parts of 5,5-dimethylhydantoin (corresponding to a ratio of epoxide groups: NH groups=2:1) and 0.2 part by volume of 30% strength aqueous sodium hydroxide solution is stirred for 2 hours and 20 minutes at 170° C. After this reaction time the melt is poured onto a metal sheet in order to cool. The resulting solid (so-called) "advanced" epoxide resin has an epoxide content of 1.97 epoxide equivalents/kg. (theory: 2.02).

Example 4

A mixture of 555 parts of epoxide resin E (liquid cycloaliphatic epoxide resin with an epoxide content of 7.2 epoxide equivalents/kg.), 128 parts of 5,5-dimethylhydantoin (corresponding to a ratio of epoxide groups: NH groups=2:1) and 0.2 part by volume of 30% strength aqueous sodium hydroxide solution is stirred for 15 hours at 160–165° C. A brittle light brown (so-called) "advanced" epoxide resin is obtained, having an epoxide content of 2.60 epoxide equivalents/kg. (theory: 2.93) and a softening point of about 100° C.

Example 5

A mixture of 334 parts of epoxide resin F (liquid cycloaliphatic epoxide resin having an epoxide content of 6.0 epoxide equivalents/kg.), 64 parts of 5,5-dimethylhydantoin (corresponding to a ratio of epoxide groups: NH groups=2:1) and 0.2 part by volume of 30% strength aqueous sodium hydroxide solution is heated to 160° C. whilst stirring. After 4 hours the epoxide content of the reaction mixture is 3.8 epoxide equivalents/kg. After 8 hours and 40 minutes the epoxide content has fallen to 3.15 epoxide equivalents/kg. After 11 hours and 15 minutes the reaction is ended by pouring the melt out onto a metal sheet.

A brownish brittle (so-called) "advanced" epoxide resin is obtained, having an epoxide content of 2.79 epoxide equivalents/kg. and a softening point of 119° C.

Example 6

290 parts of epoxide resin G (vinylcyclohexene-diepoxide of low viscosity, having an epoxide content of 13.8 epoxide equivalents/kg.), 153.6 parts of 5,5-dimethylhydantoin (corresponding to a ratio of epoxide groups: NH groups=2:1) and 0.1 part by volume of 30% strength aqueous sodium hydroxide solution are heated to 155° C., whereupon an exothermic reaction occurs. The reaction temperature is restricted to 150–160° C. by means of air cooling. After 55 minutes the epoxide content of the reaction mixture is 5.4 epoxide equivalents/kg. After 2 hours the reaction is ended by pouring the melt out onto a metal sheet. A solid brittle (so-called) "advanced" epoxide resin is obtained having an epoxide content of 3.38 epoxide equivalents/kg. and a softening point of 52° C.

Example 7

178 parts of epoxide resin H (crystalline 1,3-diglycidyl-5,5-dimethylhydantoin with an epoxide content of 8.15 epoxide equivalents/kg.), 46.4 parts of 5,5-dimethylhydantoin (corresponding to a ratio of epoxide groups: NH groups=2:1) and 0.073 part by volume of 30% strength aqueous sodium hydroxide solution are heated to 125° C. for 1 hour whilst stirring. The reaction takes place slightly exothermically. A yellowish solid (so-called) "advanced" epoxide resin is obtained having an epoxide content of 3.93 epoxide equivalents/kg.

Example 8

250 parts of epoxide resin I (liquid 1,3-diglycidyl-imidazolidone-2 having an epoxide content of 8.0 epoxide equivalents per kg.) are heated to 100° C. and 64 parts of 5,5-dimethylhydrantoin (corresponding to a ratio of epoxide groups: NH groups=2:1) are introduced over the course of 25 minutes whilst stirring, in the course of which an exothermic reaction occurs. The reaction temperature is restricted to 100° C. by cooling with ice water. When the total amount of 5,5-dimethylhydantoin has been introduced, the temperature is raised to 140° C. over the course of 35 minutes. After 50 minutes' reaction time the epoxide content of the reaction mixture is 4.1 epoxide equivalents per kg. After 1 hour and 15 minutes the reaction is ended by pouring the melt out into a container. A sticky yellowish (so-called) "advanced" epoxide resin is obtained having an epoxide content of 2.47 epoxide equivalents per kg.

Example 9

990 parts of epoxide resin K (crystalline triglycidyl-isocyanurate having an epoxide content of 9.1 epoxide equivalents per kg.) together with 0.2 part by volume of 30% strength aqueous sodium hydroxide solution are heated to 160° C. 192 parts of 5,5-dimethylhydantoin (corresponding to a ratio of epoxide groups: NH groups=3:1) are added in small portions with good stirring. The addition takes place over a period of time of 1 hour. After a total of 75 minutes the melt is poured into a dish in order to cool. A yellowish brittle (so-called) "advanced" epoxide resin is obtained which has an epoxide content of 4.97 epoxide equivalents/kg. and a softening point of 84° C.

Example 10

0.1 part by volume of 30% strength aqueous sodium hydroxide solution is added to 75.8 parts of epoxide resin A (liquid diomethane-diglycidyl ether with an epoxide content of 5.28 epoxide equivalents per kg.). 23.2 parts of 5-phenyl-5-ethylbarbituric acid are added in small portions over the course of 15 minutes with good stirring. After 65 minutes the reaction is ended. A solid (so-called) "advanced" epoxide resin is obtained having an epoxide content of 2.06 epoxide equivalents/kg. (theory: 2.02). The softening point of this product is about 50° C. and its flow point about 70° C.; the product is almost colourless and glass-clear and can advantageously be used in fluidised bed powders, in compression moulding compositions or as a casting resin.

Example 11

A mixture of 56.8 parts of epoxide resin A (liquid diomethane-diglycidyl ether having an epoxide content of 5.28 epoxide equivalents/kg.), 0.12 part of tetraethyl-ammonium chloride and 6.4 parts of barbituric acid (corresponding to a ratio of epoxide groups: NH groups=3:1) is stirred for 35 minutes at 142° C. After 20 minutes the mixture is completely clear and the epoxide content of the reaction mixture is 3.54 epoxide equivalents/kg. After the indicated reaction time an epoxide content of 2.40 epoxide equivalents/kg. (theory: 2.37) is reached. The resulting yellowish-fluorescent (so-called) "advanced" epoxide resin has a softening point of about 45° C. and starts to flow at about 65° C.

Example 12

51.2 parts of epoxide resin E (liquid cycloaliphatic epoxide resin having an epoxide content of 7.82 epoxide equivalents/kg.) are mixed with 18.4 parts of 5,5-diethyl-barbituric acid (corresponding to a ratio of epoxide groups: NH group=2:1) and 0.3 part of tetraethylammonium chloride and stirred at 155° C. After 4 hours and 15 minutes the reaction is stopped; the epoxide content of the end product is 2.90 epoxide equiivalents/kg. (theory: 2.82). The resulting (so-called) "advanced" epoxide resin is pale light ochre in colour and glass-clear; it softens at 45–50° C. and begins to flow at about 75° C.

Example 13

75.8 parts of epoxide resin A (liquid diomethane-diglycidyl ether having an epoxide content of 5.28 epoxide equivalents per kg.) are heated to 140° C. in a tall beaker whilst stirring, 0.1 part by volume of 30% strength aqueous sodium hydroxide solution is then added and 12.6 parts of 6-methyluracil (corresponding to a ratio of epoxide groups: NH groups=2:1) are gradually stirred in over the course of 45 minutes. After 2 hours the epoxide content of the reaction mixture has fallen to 2.8 epoxide equivalents/kg. and after 6 hours and 15 minutes the reaction is ended; the epoxide content of the end product is then 2.29 epoxide equivalents/kg. (theory: 2.26). The resulting (so-called) "advanced" epoxide resin is a hard and brittle, golden yellow clear product having a softening point of about 50° C., and a flow point at about 70° C. The product can advantageously be used in compression moulding powders or fluidised bed powders; it is however, also employed as a casting resin.

Example 14

A mixture of 870 parts of epoxide resin E (liquid cycloaliphatic epoxide resin having an epoxide content of 7.82 epoxide equivalents/kg.), 214 parts of 6-methyluracil and 5.6 parts of tetraethylammonium chloride is well stirred at 160° C. After 1 hour the epoxide content of the reaction mixture is 4.31 epoxide equivalents/kg.; after 2 hours it is 3.89 epoxide equivalents/kg.; after 6 hours it is 3.63 epoxide equivalents/kg.: after 10 hours it is 3.33 epoxide equivalents/kg.; after 11 hours the reaction is ended and an epoxide content of 3.25 epoxide equivalents/kg. (theory: 3.15) is attained in the end product.

The resulting brown clear transparent (so-called) "advanced" epoxide resin softens at about 65° C. and begins to flow at about 95° C.; it is particularly suitable for fluidised bed powders and for compression moulding compositions.

Example 15

73.3 parts of epoxide resin L [crystalline 3,3'-diglycidyl - 1,1' - methylene-bis-(6-methyl-5,6-dihydrouracil) having an epoxide content of 5.2 epoxide equivalents/kg.] are fused at 140° C. After adding 0.3 part by volume of 30% strength aqueous sodium hydroxide solution 12.6 parts of 6-methyluracil are slowly added over the course of 10 minutes with good stirring. After 40 minutes the reaction is stopped; the resulting (so-called) "advanced" epoxide resin has an epoxide content of 2.45 epoxide equivalents/kg. (theory: 2.33); it softens at about 100° C. and begins to flow at about 130° C.

Example 16

151.6 g. of a liquid diomethane-diglycidyl ether having an epoxide content of 5.28 equivalents/kg. (epoxide resin A) are heated to 145° C. 0.2 ml. of 30% strength sodium hydroxide solution is added whilst stirring, and 38.6 g. of 2,4 - dioxo-5,5-dimethyl-6-isopropylhexahydropyrimidine (corresponding to a ratio of epoxide groups to NH groups of 2:1) are then added in small portions over the course of 30 minutes with vigorous stirring. The temperature is raised to 155° C. and the mixture stirred for 17 hours at this temperature. After about 8 hours a homogeneous pale yellow melt is produced, having an epoxide content of 4.30 equivalents/kg. After 17 hours an epoxide content of 2.95 equivalents per kg. has been reached and the pale yellow melt is poured onto an aluminium sheet to cool and the product is subsequently comminuted. The (so-called) "advanced" epoxide resin thus obtained is clear, transparent and pale yellow; it softens at 45° C.

Example 17

87.0 g. of a (3',4' - epoxy-cyclohexyl-methyl) - 3,4-epoxycyclohexanecarboxylate having an epoxide content of 7.8 equivalents/kg. (epoxide resin E) are mixed with 0.56 g. of tetraethylammonium chloride and 31.3 g. of 2,4-dioxo - 5,5 - dimethyl-6-isopropyl-hexahydro-pyrimidine (corresponding to a ratio of epoxide groups to NH groups of 2:1) and the mixture is thoroughly stirred at 162° C. After two hours the epoxide content of the mixture is 5.10 epoxide equivalents/kg. and after 34 hours it is 3.17 epoxide equivalents/kg. After 41 hours the resin is poured out onto an aluminium foil. The resulting (so-called) "advanced" epoxide resin is clear, transparent and light ochre in colour and has an epoxide content of 2.96 epoxide equivalents/kg. (theory=2.88 epoxide equivalents/kg.); its softening point is 48° C.; the melting range is 48–64° C.

Example 18

A mixture of 151.6 g. of a diomethane-diglycidyl ether having an epoxide content of 5.28 epoxide equivalents/kg. (epoxide resin A), 0.2 ml. of 30% strength sodium hydroxide solution and 28.43 g. of 2,4-dioxo-5,5-dimethyl-hexahydropyrimidine (corresponding to a ratio of epoxide groups to NH groups of 2:1) is heated to 150° C. whilst stirring. After 5 hours the epoxide content of the melt is 3.50 epoxide equivalents/kg. and after 10 hours it is 2.90. After 18 hours the clear light yellow melt is poured onto an aluminium foil in order to cool. The resulting (so-called) "advanced" epoxide resin has an epoxide content of 2.41 epoxide equivalents/kg. (theory=2.22 equivalents/kg. and softens at 58° C.

Example 19

A mixture of 150.1 g. of Δ⁴-tetrahydrophthalic acid diglycidyl ester having an epoxide content of 6.65 epoxide equivalents/kg. (epoxide resin C), 3 drops of 30% strength sodium hydroxide solution and 35.6 g. of 2,4-dioxo-5,5-dimethyl-hexahydro-pyrimidine (corresponding to a ratio of epoxide groups to NH groups of 2:1) is stirred for 2 hours at 152° C. and thereafter poured out onto an aluminium sheet. The resulting (so-called) "advanced" epoxide resin is a yellow-coloured faintly cloudy viscous product; it has an epoxide content of 3.70 epoxide equivalents/kg.

Example 20

105.8 g. of triglycidyl isocyanurate having an epoxide content of 9.5 epoxide equivalents/kg. (epoxide resin K) are fused at 125° C. 4 drops of 30% strength sodium hydroxide solution are added at 130° C. followed by 35.6 g. of 2,4-dioxo-5,5-dimethylhexahydropyrimidine (corresponding to a ratio of epoxide groups to NH groups of 3:1) added in portions over the course of 30 minutes. After 30 minutes the epoxide content of the melt is 7.15 epoxide equivalents/kg. After 2½ hours the melt is poured onto an aluminium foil. The resulting (so-called) "epoxide resin" is colourless and slightly cloudy; it has an epoxide content of 5.15 equivalents/kg.; it softens at 56° C.; at 75° C. it melts completely.

Example 21

A mixture of 174.0 g. of (3',4'-epoxycyclohexylmethyl) - 3,4 - epoxycyclohexane-carboxylate having an epoxide content of 7.8 epoxide equivalents/kg. (epoxide resin E), 1.20 g. of tetraethylammonium chloride and 48.4 g. of 2,4-dioxo-5,5-dimethylhexahydropyrimidine (corresponding to a ratio of epoxide groups to NH groups of 2:1) is stirred for 30 hours at 165° C. and then poured out onto an aluminium foil.

The resulting (so-called) "advanced" epoxide resin is light brown and slightly tacky. The epoxide content of the product is 3.11 epoxide equivalents/kg. (theory: 3.06 epoxide equivalents/kg.) and the softening point is 35° C.

Example 22

50 parts of epoxide resin M (crystalline tri-[α-methylglycidyl]-isocyanurate having an epoxide content of 8.49 epoxide equivalents per kg.), 13.1 parts of 5,5-dimethylhydantoin (corresponding to a ratio of epoxide groups: HN group=2:1) and 0.1 part by volume of 30% strength aqueous sodium hydroxide solution are heated to 155°–165° C. whilst stirring. After 4 hours and 30 minutes the epoxide content of the reaction mixture is 3.96 epoxide equivalents per kg. After 6 hours and 20 minutes the reaction is ended by pouring the melt out onto a metal sheet.

A brittle (so-called) "advanced" epoxide resin is obtained having an epoxide content of 3.04 epoxide equivalents/kg. and a softening point of 90° C.

Example 23

755 parts of epoxide resin A (liquid diomethane-diglycidyl ether with an epoxide content of 5.3 epoxide equivalents/kg.), 142 parts of 5-isopropylhydantoin (corresponding to a ratio of epoxide group:NH group=2:1) and 0.4 part by volume of 30% strength aqueous sodium hydroxide solution are heated to 160° C. and then stirred for 6 hours and 30 minutes at this temperature.

After 1 hour and 50 minutes the epoxide content is 2.7 epoxide equivalents/kg. A solid (so-called) "advanced" epoxide resin is obtained having an epoxide content of 2.24 epoxide equivalents per kg. and a softening point of 56° C.

USE EXAMPLES

Example I 112 parts of the (so-called) "advanced" epoxide resin manufactured in Example 1, having an epoxide content of 2.32 epoxide equivalents/kg. and a softening point of 48° C., are fused together with 55 parts of hexahydrophthalic anhydride at about 100° C., cast into pre-warmed aluminum mounds and cured for 30 hours at 150° C. Castings having the following properties are obtained:

Flexural strength (VSM 77,103)—15.1 kg./mm.$^2$
Deflection at break—12.3 mm.
Impact strength (VSM 77,105)—6.5 cm.×kg./cm.$^2$
Heat distortion point according to Martens (DIN 53,458)—102° C.
Boiling water uptake after 1 hour—0.28%
Tracking resistance (VDE 0303)—level KA 3 c
Arcing resistance (VDE 0303)—level L 4
Dielectric loss factor $tg\ \delta$ (20° C., 50 cycles/second)—0.005
Dielectric constant $\epsilon$ at 20° C.—3.5
Specific resistance at 20° C. (VDE)—7×10$^{16}$Ω× cm.

If in the above Example 30 parts of phthalic anhydride are used instead of 55 parts of hexahydrophthalic anhydride are used instead of 55 parts of hexahydrophthalic anhydride and the mixture is cured for 16 hours at 150° C., castings of the following properties are obtained.

Flexural strength (VSM)—13.9 kg./mm.$^2$
Deflection at break—11.9 mm.
Impact strength (VSM)—8.9 cm.×kg./cm.$^2$
Heat distortion point according to Martens (DIN)—124° C.
Boiling water uptake after 1 hour—0.54%
Tracking resistance (VDE)—level KA 3 c
Arcing resistance (VDE)—level L 1
Dielectric loss factor $tg\ \delta$ (20° C., 50 cycles/second)—0.0004
Dielectric constant $\epsilon$ at 20° C.—3.7
Specific resistance at 20° C.—7.5×10$^{16}$Ω×cm.

Example II 103 parts of the (so-called) "advanced" epoxide resin manufactured in Example 2, having an epoxide content of 2.84 epoxide equivalents/kg., are fused together with 55 parts of hexahydrophthalic anhydride at about 100° C., and the mixture is cast into aluminum moulds and cured for 30 hours at 150° C. Castings having the following properties are obtained:

Flexural strength (VSM)—8.75 kg./mm.$^2$
Heat distortion point according to Martens (DIN 53,458)—85° C.
Boiling water uptake after 1 hour—1.04%
Tracking resistance (VDE 0303)—level Ka 3 c
Arcing resistance (VDE 0303)—level L 4
Dielectric loss factor $tg\ \delta$ (90° C., 50 cycles/second)—0.007
Dielectric constant $\epsilon$ at 20° C.—3.5
Specific resistance at 30° C. (VDE)—1.5×10$^{17}$Ω×cm.

If in the above example only 92 parts instead of 112 parts of the (so-called) "advanced" epoxide resin described in Example 1 are used and the mixture is cured under otherwise the same conditions, castings having the following properties are obtained:

Flexural strength (VSM)—15.0 kg./mm.$^2$
Deflection at break—9.80 mm.
Impact strength (VSM)—12.7 cm.×kg./cm.$^2$
Boiling water uptake after 1 hour—0.88%

Example III 118 parts of the (so-called) "advanced" epoxide resin manufactured in Example 3, having an epoxide content of 1.97 epoxide equivalents/kg., are fused together with 33 parts of hexahydrophthalic anhydride at about 100° C., cast into prewarmed aluminum moulds and cured for 4 hours at 80° C. and then for 10 hours at 140° C. Castings having the following properties are obtained:

Flexural strength (VSM)—10.4 kg./mm.$^2$
Deflection at break—7.1 mm.
Impact strength (VSM)—6.7 cm.×kg./cm.$^2$
Heat distortion point according to Martens (DIN)—73° C.
Boiling water uptake after 1 hour—1.3%
Tracking resistance (VDE)—level KA 3 c
Arcing resistance (VDE)—level L 4
Dielectric loss factor $tg\ \delta$ (20° C., 50 cycles/second—0.006
Dielectric constant $\epsilon$ at 20° C.—3.4
Specific resistance at 20° C.—6.5×10$^{16}$Ω×cm.

Example VI 66 parts of the (so-called) "advanced" epoxide resin manufactured in Example 7, having an epoxide content of 3.93 epoxide equivalents/kg., are mixed with 55 parts of hexahydrophthalic anhydride at about 100° C. The mixture is poured into aluminum moulds and cured for 30 hours at 150° C. Castings having the following properties are obtained:

Flexural strength (VSM)—11.7 kg./cm.$^2$
Deflection at break—6.2 mm.
Impact strength (VSM)—16.3 cm.×kg./cm.$^2$
Heat distortion point according to Martens (DIN)—144° C.
Boiling water uptake after 1 hour—1.13%

Example V 48.6 parts of the (so-called) "advanced" epoxide resin manufactured in Example 10, having an epoxide content of 2.06 epoxide equivalents/kg., are mived with 12.5 parts of hexahydrophthalic anhydride at about 100° C. The mixture is cast into aluminum moulds and cured for 5 hours at 120° C. and then for 15 hours at 150° C. Castings having the following properties are obtained:

Flexural strength (VSM)—8.5 kg./mm.$^2$
Heat distortion point according to Martens (DIN)—105 ° C.
Water uptake (4 days, 20° C.)—0.31%

Example VI 76 parts of the (so-called) "advanced" epoxide resin manufactured in Example 12, having an epoxide content of 2.90 epoxide equivalents/kg., are fused together with 27.4 parts of hexahydrophthalic anhydride at about 100° C. The mixture is poured into aluminum moulds and cured for 5 hours at 120° C. and then for 15 hours at 150° C. The resulting castings have a heat distortion point according to Martens (DIN) of 168° C.

Example VII 80 parts of the (so-called) "advanced" epoxide resin manufactured in Example 13, having an epoxide content of 2.29 epoxide equivalents/kg., are fused together with 25 parts of hexahydrophthalic anhydride at about 100° C. The mixture is poured into aluminium moulds and cured for 4 hours at 120° C. and then for 15 hours at 150° C. Castings having the following properties are obtained:

Heat distortion point according to Martens (DIN)— 114° C.
Water uptake (4 days, 20° C.)—0.37%

Example VIII 74.7 g. of the (so-called) "advanced" epoxide resin manufactured according to Example 16 (epoxide content=2.95 epoxide equivalents/kg.) are heated to 90° C.; the clear melt is thoroughly mixed with 23.5 g. of fused hexahydrophthalic anhydride and is subsequently briefly subjected to a vacuum of 15 mm. Hg to remove air bubbles. The mixture is poured into aluminium moulds pre-warmed to 100° C. and cured in accordance with the following temperature programme: 1 hour at 100° C., 4 hours at 120° C. and 15 hours at 150° C.

The resulting mouldings are yellow, clear and transparent; they show the following properties:

Flexural strength (VSM)—10.4 kg./mm.$^2$
Deflection at break—7.0 mm.
Impact strength (VSM)—6.1 cm. kg./cm.$^2$
Cold water uptake (4 days, 20° C.)—0.27%

Example IX

A homogeneous mixture is prepared at 80° C. from 100 g. of a (so-called) "advanced" epoxide resin manufactured according to Example 16 (epoxide content=2.95 epoxide equivalent/kg.) and 46 g. of an anhydride mixture of 9 parts of phthalic anhydride, 13 parts of Δ$^4$-tetrahydrophthalic anhydride, 78 parts of hexahydrophthalic anhydride and 15 parts of cresyl-glycid. This mixture is warmed to 90° C., briefly subjected to a vacuum of about 15 mm. Hg and subsequently poured into aluminium moulds pre-warmed to 100° C. The cure is effected according to the temperature programme quoted in Example 8. The light orange-coloured clear transparent mouldings thus obtained show the following properties:

Flexural strength (VSM)—10.4 kg./mm.$^2$
Deflection at break—6.7 mm.
Impact strength (VSM)—6.3 cm. kg./cm.$^2$
Heat distortion point according to Martens (DIN)—92° C.
Water uptake (4 days, 20° C.)—0.23%

Example X 67.6 g. of a (so-called) "advanced" epoxide resin manufactured according to Example 17 (epoxide content=2.96 epoxide equivalents/kg.) are thoroughly mixed with 26.2 g. of fused hexahydrophthalic anhydride at 80° C., warmed to 90° C., briefly subjected to a vacuum of 12 mm. Hg and poured into moulds pre-warmed to 120° C. The cure is effected for 3 hours at 120° C. and subsequently for 15 hours at 150° C. The resulting castings are light brown, clear and transparent and show a flexural strength of 6.0 kg./mm.$^2$ with a deflection of 3.5 mm.

Example XI 67.6 g. of a (so-called) "advanced" epoxide resin (epoxide content=2.41 epoxide equivalents/kg.) manufactured according to Example 18 are mixed at 100° C. with 26.2 g. of hexahydrophthalic anhydride and then poured into an aluminium mould pre-warmed to 100° C. The cure takes place in accordance with the temperature programme mentioned in Example VIII. The light yellow clear transparent mouldings have the following properties:

Flexural strength (VSM)—1.4 kg./mm.$^2$
Deflection at break—4.7 mm.
Heat distortion point according to Martens (DIN)—111° C.
Cold water uptake (4 days, 20° C.)—0.28%

Example XII

A mixture is manufactured at 90° C. from 70 g. of a (so-called) "advanced" epoxide resin manufactured according to Example 18 (epoxide content=2.41 epoxide equivalents/kg.) and 40 g. of an anhydride curing agent mixture of 9 parts of phthalic anhydride, 13 parts of Δ$^4$-tetrahydrophthalic anhydride, 78 parts of hexahydrophthalic anhydride and 15 parts of cresyl glycid.

This mixture is poured into aluminium moulds pre-warmed to 100° C. and cured in accordance with the temperature programme quoted in Example VIII.

The light orange-coloured glass-clear mouldings show the following properties:

Flexural strength (VSM)—10.3 kg./mm.$^2$
Deflection at break—6.6 mm.
Impact strength (VSM)—5.9 cm. kg./cm.$^2$
Heat distortion point according to Martens (DIN)—95° C.
Cold water uptake (4 days, 25° C.)—0.25%

Example XIII 20 parts of the (so-called) "advanced" epoxide resin manufactured in Example 1 were finely powdered in a hammer mill, thoroughly mixed with 2.26 parts of bis-(p-aminophenyl)-methane and then fused in a tin can which had beforehand been treated with release agent, brought to the point of gelling at 80° C. and cured for 2 hours at 80° C. and 8 hours at 140° C. After cooling to room temperature the cured plastic plaque was taken out of the tin can and the Shore-C hardness was measured according to DIN 53505. A value of 95 units was recorded.

If instead of bis-(p-aminophenyl)-methane the liquid cycloaliphatic polyamine is used, a plastic having a Shore-C hardness of 85 units is obtained.

Example XIV

In the three experiments which follow, 50 parts of the (so-called) "advanced" epoxide resin manufactured in Example 1 were in each case fused, thoroughly mixed with the amounts of three different amine curing agents given in the table below (the amine curing agents were in each case pre-warmed to 90° C. beforehand) and then immediately poured into a metal mould in order to cast standard rods for determining the heat distortion point according to Martens DIN 53458. The standard rods were again cured for 2 hours at 80° C. and 8 hours at 140° C., taken out of the mould after cooling to room temperature, and brought to the dimensions prescribed in the standard by milling.

Determination of the heat distortion point gave the following values:

|  | Experiment | | |
| --- | --- | --- | --- |
|  | 1 | 2 | 3 |
| (So-called) "advanced" epoxide resin according to Example 1, parts | 50 | 50 | 5.0 |
| Bis-(p-aminophenyl)-methane, parts | 5.65 | | |
| Bis-(3-methyl-4-aminocyclohexyl)-methane, parts | | 6.85 | |
| Polyaminoamide curing agent, registered trade name "Genamid GMI 350," parts | | | 14.7 |
| Heat distortion point according to Martens (DIN), °C | 103 | 95 | 56 |

Example XV

A pulverulent mixture of the finely ground (so-called) "advanced" epoxide resin according to Example 1 and bis - (p - aminophenyl) - methane in a mixing ratio of 100:11.3 parts was used for the manufacture of a laminate sheet:

For this purpose 12 square cuttings of 12 cm. edge length of woven glass fabric 92145 of Messrs. Interglas having a finish based on a methacrylato-chromium$^{III}$-chloride complex (registered trade name "Volan") were prepared. The first cutting was laid on a sheet of cellophane which had first been pre-treated with release agent, then powdered with the pulverulent resin-curing agent mixture, the next piece of woven glass fabric was laid on top and again powdered, and so on. After laying the 12th piece of woven glass fabric on top, the entire packet was wrapped in the cellophane sheet and introduced between two metal sheets into a press pre-warmed to 160° C. Gelling was started under contact pressure and the system then cured under pressure for 1 hour. After a post-cure of 10 hours at 120° C. effected outside the press the mechanical properties of the resulting laminates were determined (the layer thickness was 3 mm. and the glass content was 63.5%). The following values were measured:

Flexural strength (VSM) 50.6 kg./mm.$^2$
Impact strength (VSM) 117.5 cm. kg./cm.$^2$
Deflection before break 4.8 mm.

We claim:
1. An advanced addition product having an average of more than one 1,2-epoxy groups, which is obtained by heating at reaction temperature 100–200° C. a mixture of
(1) a polyepoxide having an average of at least 2 and at most 3 epoxide groups in the molecule, and
(2) less than 1 equivalent of NH groups per 1 epoxide group equivalent of the polyepoxide (1) of a mononuclear N-heterocyclic compound of general formula

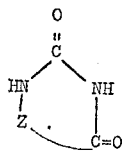

where Z is a member selected from the group consisting of $$-\underset{\underset{O}{\|}}{C}-$$

the radical of formula

the radical of formula

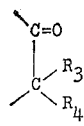

the radical of formula

and the radical of formula

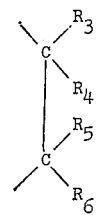

where $R_1$, $R_3$ and $R_5$ each are members selected from the group consisting of hydrogen atom, alkyl, cycloalkyl, alkenyl, cycloalkenyl, phenyl and substituted phenyl; $R_2$, $R_4$ and $R_6$ each are members selected from the group consisting of hydrogen atom and alkyl with 1 to 4 carbon atoms; or together $R_1$ and $R_2$ form the tetramethylene or pentamethylene group.

2. An adduct as claimed in claim 1 characterised in that 0.02 to 0.5 equivalent of NH groups of the N-heterocyclic compound (2) have been employed for their formation per 1 equivalent of epoxide group.

3. An adduct as claimed in claim 2 characterised in that 0.06 to 0.3 equivalent of NH groups of the N-heterocyclic compound (2) have been employed for their formation per 1 equivalent of epoxide group.

4. An adduct as claimed in claim 1, wherein the polyepoxide (1) is a diglycidyl ether of a diphenol.

5. An adduct as claimed in claim 4, wherein the polyepoxide (1) is the diglycidyl ether of 2,2-bis(p-hydroxyphenyl)propane.

6. An adduct as claimed in claim 1, wherein the polyepoxide (1) is a cycloaliphatic polyepoxide.

7. An adduct as claimed in claim 6, wherein the polyepoxide (1) is $\Delta^4$-tetrahydrophthalic acid diglycidyl ester or hexahydrophthalic acid diglycidyl ester.

8. An adduct as claimed in claim 6, wherein the polyepoxide (1) is bis(3,4 - epoxycyclohexylmethyl)-adipate or bis(3,4-epoxy-6-methyl-cyclohexylmethyl)adipate.

9. An adduct as claimed in claim 6, wherein the polyepoxide (1) is (3',4' - epoxy-cyclohexylmethyl) - 3,4-epoxycyclohexane-carboxylate or (3',4'-epoxy-6'-methyl-cyclohexylmethyl) - 3,4 - epoxy-6-methyl - cyclohexane-carboxylate.

10. An adduct as claimed in claim 6, wherein the polyepoxide (1) is 3-(3',4'-epoxycyclohexyl)-2,4-dioxaspiro (5,5)-8,9-epoxy-undecane.

11. An adduct as claimed in claim 6, wherein the polyepoxide (1) is vinylcyclohexene-diepoxide.

12. An adduct as claimed in claim 1, wherein the polyepoxide (1) is an N-heterocyclic polyepoxide.

13. An adduct as claimed in claim 12, wherein the polyepoxide (1) is triglycidyl isocyanurate.

14. An adduct as claimed in claim 12 characterised in that the polyepoxide (1) is tri-($\beta$-methyl-glycidyl)-isocyanurate.

15. An adduct as claimed in claim 12, wherein the polyepoxide (1) is 1,3-diglycidyl-5,5-dimethyl-hydantoin or 1,3-diglycidyl-5-isopropyl-hydantoin.

16. An adduct as claimed in claim 12, wherein the polyepoxide (1) is 1,3-diglycidyl-imidazolidone-2 or 1,3-diglycidyl - 5,5 - dimethyl - 5,6 - dihydro-uracil or 1,3-diglycidyl - 5,5 - dimethyl - 6 - isopropyl-5,6-dihydro-uracil.

17. An adduct as claimed in claim 1, wherein the mononuclear N-heterocyclic compound (2) is a hydantoin of general formula

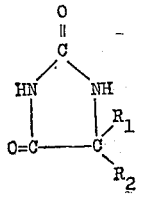

wherein $R_1$ and $R_2$ each represents hydrogen or lower alkyl having 1 to 4 carbon atoms, or wherein $R_1$ and $R_2$ together form the tetramethylene or pentamethylene residue.

18. An adduct as claimed in claim 17, wherein N-heterocyclic compound (2) is 5,5-dimethylhydantoin or 5-isopropylhydantoin.

19. An adduct as claimed in claim 1, wherein the N-heterocyclic compound (2) is parabanic acid.

20. An adduct as claimed in claim 1, wherein the N-heterocyclic compound (2) is a barbituric acid of general formula

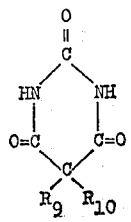

wherin $R_9$ and $R_{10}$ each represents a member selected from the group consisting of hydrogen atom, alkyl, alkenyl, cycloalkyl, cycloalkenyl, phenyl and substituted phenyl.

21. An adduct as claimed in claim 1, wherein the N-heterocyclic compound (2) is a uracil of general formula

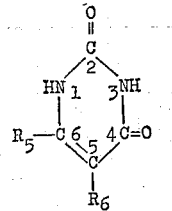

wherein $R_5$ and $R_6$ both are hydrogen, or one of the two symbols $R_5$ and $R_6$ represents hydrogen and the other represents the methyl group.

22. An adduct as claimed in claim 1, wherein the N-heterocyclic compound (2) is a dihydro-uracil of general formula

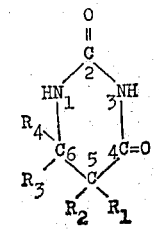

wherein $R_1$ and $R_2$ each represents alkyl, and $R_3$ and $R_4$ each represents hydrogen or alkyl.

23. An adduct as claimed in claim 22, wherein the N-heterocyclic compound is 5,5-dimethyl-5,6-dihydro-uracil or 5,5-dimethyl-6-isopropyl-5,6-dihydro-uracil.

References Cited
UNITED STATES PATENTS 3,449,353   6/1969   Porret et al. _____ 260—47 Ep
3,503,979   3/1970   Habermeier et al.

WILLIAM H. SHORT, Primary Examiner

T. E. PLRTILLA, Assistant Examiner

U.S. Cl. X.R.

117—124 E, 161 ZB; 161—185, 186; 260—47 Ep, 59, 77.5 R, 78.4 Ep, 80 P, 258, 260, 309.5, 830 TW, 831, 834